United States Patent
Kanazawa

(10) Patent No.: US 9,214,685 B2
(45) Date of Patent: Dec. 15, 2015

(54) FUEL CELL SYSTEM

(75) Inventor: Hirofumi Kanazawa, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 1240 days.

(21) Appl. No.: 12/297,823

(22) PCT Filed: May 9, 2007

(86) PCT No.: PCT/JP2007/059995
§ 371 (c)(1),
(2), (4) Date: Oct. 20, 2008

(87) PCT Pub. No.: WO2007/138855
PCT Pub. Date: Dec. 6, 2007

(65) Prior Publication Data
US 2009/0068539 A1    Mar. 12, 2009

(30) Foreign Application Priority Data
May 25, 2006  (JP) .................................. 2006-145502

(51) Int. Cl.
*H01M 8/04* (2006.01)

(52) U.S. Cl.
CPC ...... *H01M 8/04126* (2013.01); *H01M 8/04253* (2013.01); *H01M 2250/20* (2013.01); *Y02E 60/50* (2013.01); *Y02T 90/32* (2013.01)

(58) Field of Classification Search
CPC ................................. H01M 8/04126
USPC ....................................... 429/415
See application file for complete search history.

(56) References Cited

U.S. PATENT DOCUMENTS

2004/0062975 A1 * 4/2004 Yamamoto et al. ............. 429/34
2004/0234829 A1 * 11/2004 Sederquist et al. ............. 429/26

FOREIGN PATENT DOCUMENTS

| EP | 1398263 | * | 3/2004 | ............. B62M 7/00 |
| JP | 8-185883 A | | 7/1996 | |
| JP | 8-195215 A | | 7/1996 | |
| JP | 2001-102073 A | | 4/2001 | |
| JP | 2002-231294 A | | 8/2002 | |
| JP | 2002-313378 A | | 10/2002 | |
| JP | 2002-373697 A | | 12/2002 | |
| JP | 2004-165059 A | | 6/2004 | |
| JP | 2004-185844 A | | 7/2004 | |
| JP | 2004185844 | * | 7/2004 | ............. H01M 8/06 |
| JP | 2005-71730 A | | 3/2005 | |
| JP | 2005-129494 A | | 5/2005 | |
| JP | 2005-149839 A | | 6/2005 | |
| JP | 2005-231549 A | | 9/2005 | |
| JP | 2005-251493 A | | 9/2005 | |
| JP | 2006-49224 A | | 2/2006 | |

(Continued)

OTHER PUBLICATIONS

Office Action issued Apr. 3, 2012 in JP 2006-145502 and English translation thereof.

*Primary Examiner* — Ula C Ruddock
*Assistant Examiner* — Archer Dudley
(74) *Attorney, Agent, or Firm* — Kenyon & Kenyon LLP

(57) ABSTRACT

Piping interconnecting a fuel cell and a humidifier is laid with a rising gradient from the end on the humidifier side of the piping toward the end on the fuel cell side of the piping. The piping is first bent vertically downward and then vertically upward, and this forms a water containing trap in the piping. Problems caused by freezing of condensed water occurring in the piping can be avoided.

8 Claims, 3 Drawing Sheets

(56) References Cited

FOREIGN PATENT DOCUMENTS

| | | |
|---|---|---|
| JP | 2006-286280 A | 10/2006 |
| JP | 2007-141524 A | 6/2007 |
| JP | 2007-188641 A | 7/2007 |
| WO | 2005/028291 A1 | 3/2006 |

* cited by examiner

FUEL CELL SYSTEM

This is a 371 national phase application of PCT/JP2007/059995 filed 9 May 2007, claiming priority to Japanese Patent Application No. JP 2006-145502 filed 25 May 2006, the contents of which are incorporated herein by reference.

TECHNICAL FIELD

The present invention relates to a fuel cell system to be mounted on a vehicle or an on-vehicle fuel cell system, and more particularly to a structure of piping connected to a humidifier which humidifies gas to be supplied to a fuel cell.

BACKGROUND ART

Many on-vehicle fuel cell systems include a humidifier for humidifying at least one of gas to be supplied to an oxygen electrode (i.e. a cathode electrode) and gas to be supplied to a hydrogen electrode (i.e. an anode electrode), in order to accelerate a power generation reaction of the fuel cell. FIG. 1 shows an example of a portion of a fuel cell system relevant to a fuel cell and humidifiers, in which arrows indicate the flowing directions of the gas. The fuel cell system shown in FIG. 1 includes a fuel cell 10, an anode-side humidifier 12 which humidifies hydrogen to be supplied to an anode electrode of the fuel cell 10, and a cathode-side humidifier 14 which humidifies air to be supplied to a cathode electrode of the fuel cell 10. The anode-side humidifier 12 and the cathode-side humidifier 14 humidify the gas to be supplied, via a humidification membrane provided therein.

The anode-side humidifier 12 is connected to the fuel cell 10 through anode-side gas supply piping 16. Thus, hydrogen is humidified in the anode-side humidifier 12 and then supplied to the anode electrode of the fuel cell 10 through the anode-side gas supply piping 16.

Because water is generated as a result of a chemical reaction in the cathode electrode of the fuel cell 10, discharge gas from the cathode side of the fuel cell 10 contains a great amount of water vapor. The cathode-side humidifier 14 utilizes the water content contained in the discharge gas from the cathode side to humidify the air to be supplied. The cathode-side humidifier 14 is connected to the fuel cell 10 through cathode-side gas supply piping 18 and cathode-side gas discharge piping 20. The cathode-side humidifier 14 draws the discharge gas from the cathode electrode of the fuel cell 10 via the cathode-side gas discharge piping 20 and transfers, via the humidification membrane, the water content contained in the discharge gas from the cathode electrode to the air to be supplied, thereby humidifying the air to be supplied to the cathode electrode. The air to be supplied, which is thus humidified is then supplied to the cathode electrode. The discharge gas from the cathode side of the fuel cell 10, whose water content has been transferred to the air to be supplied in the cathode-side humidifier 14, is then externally discharged through humidifier discharge piping 22.

The gas passing through the anode-side gas supply piping 16 and the cathode-side gas supply piping 18, which has been humidified by the humidifiers 12 and 14, respectively, contains a great amount of water content. Similarly, the discharge gas passing through the cathode-side gas discharge piping 20 contains water generated as a result of the reaction of the cathode electrode and therefore contains a great amount of water content. Consequently, there are cases in which condensation occurs in the piping 16, 18, and 20 interconnecting the fuel cell and the humidifiers, when the temperature of the gas within the piping decreases after the termination of the operation of the fuel cell. Condensation occurring in the piping may further cause condensed water to be stored in the fuel cell and the humidifiers.

As described above, in the fuel cell systems, it is likely that condensation will occur, especially in the piping connected to the humidifiers. If condensation occurs in the piping, condensed water is accumulated in the fuel cell and the humidifiers, and the condensed water thus accumulated freezes at a low temperature, which interferes with the start of the operation of the fuel cell. It is therefore necessary to prevent condensed water from being stored in the fuel cell and humidifier. It is particularly necessary to prevent condensed water from being stored in the fuel cell.

Further, in many cases, the humidification membrane provided in the humidifier is formed of a resin and is therefore sensitive to heat. For example, the life of some humidification membranes is shortened by approximately half with an increase in the usage temperature by approximately 10° C. It is therefore necessary to maintain the temperature around the humidifier as low as possible in order to extend the useful life of the humidification membrane.

DISCLOSURE OF THE INVENTION

In accordance with one aspect of the present invention, there is provided a fuel cell system, which is an on-vehicle fuel cell system, comprising a fuel cell, a humidifier which humidifies gas to be supplied to the fuel cell, gas supply piping which interconnects the fuel cell and the humidifier and serves as a passage for the gas to be supplied, wherein the gas supply piping includes a water containing trap for storing water.

BRIEF DESCRIPTION OF THE DRAWINGS

These and other objects of the invention will be explained in the description below, in connection with the accompanying drawings, in which.

BEST MODE FOR CARRYING OUT THE INVENTION

Preferred embodiments of the present invention will be described with reference to the drawings.

Figure 1:
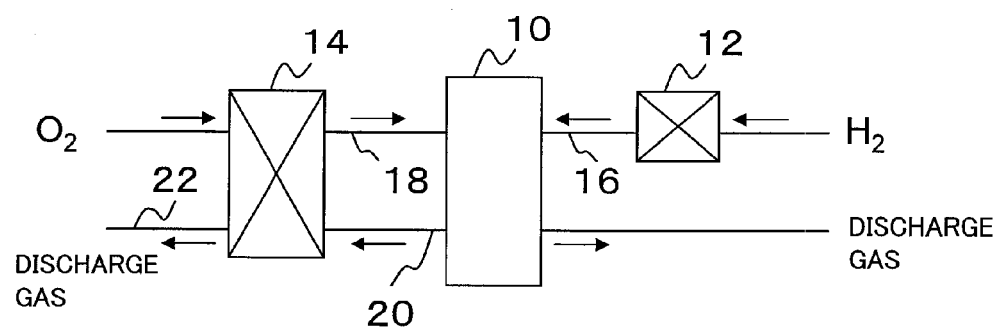
FIG. 1 is a view showing an example partial structure of a fuel cell system.
Figure 2:
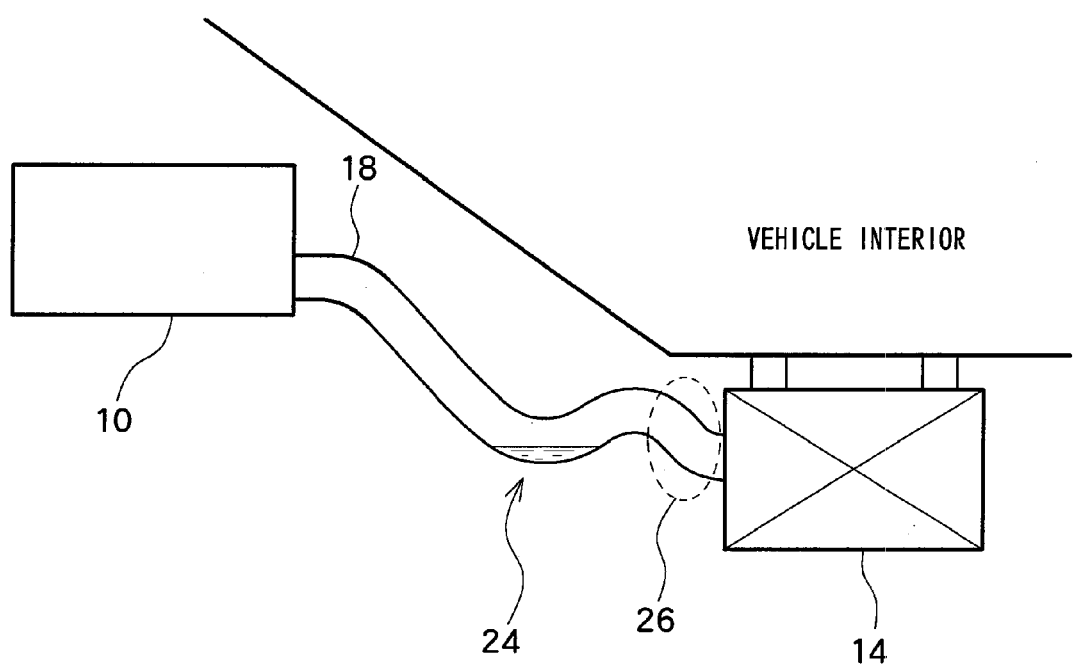
FIG. 2 is a view showing one embodiment of the present invention.

FIG. 2 is a view showing an embodiment of the present invention. Here, cathode-side gas supply piping 18 which interconnects a fuel cell 10 and a cathode-side humidifier 14 will be described as an example. It should be noted that in FIG. 2, other devices and piping provided in a fuel cell system, including cathode-side gas discharge piping 20, humidifier gas discharge piping 22, an anode-side humidifier 12, and so on, are not shown.

The gas supply piping 18 interconnecting the fuel cell 10 and the humidifier 14 is disposed with a rising gradient from the end portion of the gas supply piping 18 on the side of the humidifier 14 toward the end portion of the gas supply piping 18 on the side of the fuel cell 10. More specifically, the fuel cell 10 and the humidifier 14 are mounted on a vehicle such that an inlet port of the fuel cell 10 for the supplied gas, which is connected with one end of the gas supply piping 18, is located at a higher level than an outlet port of the humidifier 14 for the gas to be supplied, which is connected to the other end of the gas supply piping 18. With this structure, the condensed water generated within the piping 18 flows, along the gradient of the piping, downward toward the humidifier 14 and does not flow toward the fuel cell 10. Accordingly, it is possible to prevent the condensed water from being stored in the fuel cell 10 to thereby avoid the problems caused by freezing of the condensed water.

Here, in order to dispose the gas supply piping 18 with a rising gradient from the end on the side of the humidifier toward the end on the side of the fuel cell, the fuel cell 10 is installed within an engine compartment of the vehicle and the humidifier 14 is placed under the floor of the vehicle, for example, in FIG. 2. In addition, the ambient temperature is lower under the floor of the vehicle, which is exposed to the outside the vehicle, than that in the engine compartment. It is therefore possible to extend the useful life of the humidification membrane, which is included in the humidifier 14 and which is not resistant to heat, when the humidifier 14 is provided under floor of the vehicle, compared to when the humidifier 14 is mounted within the engine compartment.

In the gas supply piping 18, a water containing trap 24 is provided for storing condensed water generated within the piping. The water containing trap 24 is formed by first bending the gas supply piping 18 vertically downward and then bending the gas supply piping 18 vertically upward. In other words, the water containing trap 24 includes a bent portion in the gas supply piping 18 which is curved vertically downward relative to the portions of the gas supply piping located front and back of the bent portion. With this structure, when the condensed water is generated within the gas supply piping 18, the condensed water flows downward along the gradient and is stored in the water containing trap 24. As such, it is possible to prevent the condensed water which is generated from being stored in the humidifier 14 to thereby further prevent freezing of the condensed water.

In particular, in order to prevent the condensed water from being stored in the humidifier 14, it is preferable that the water containing trap 24 is provided in a portion of the gas supply piping 18 which is closer to the humidifier 14 than to the fuel cell 10. Here, while the condensed water generated in a portion 26 of the gas supply piping 18 may flow into the humidifier 14, the amount of the condensed water to be stored in the humidifier 14 can be reduced by decreasing the length of the portion 26 of the gas supply piping 18.

Figure 3:
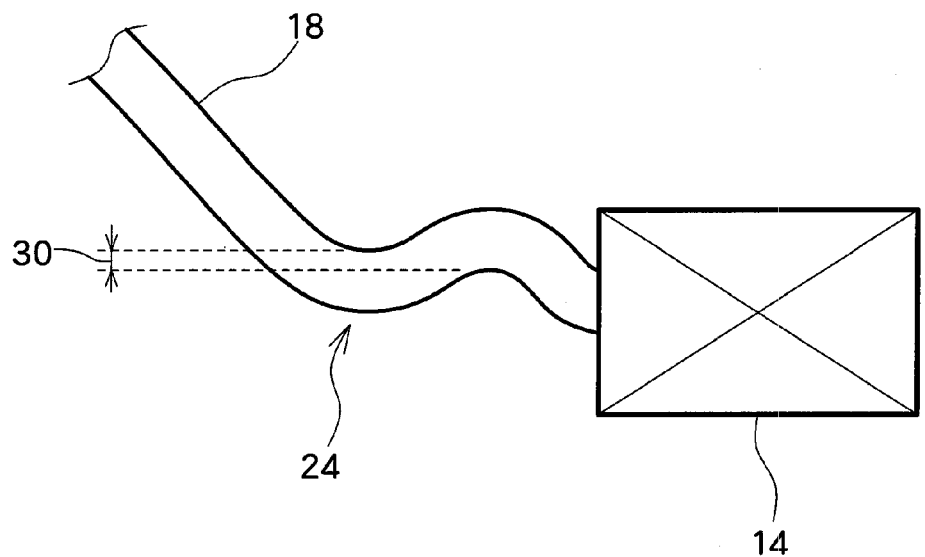
FIG. 3 is an enlarged view showing a bent portion of a water containing trap according to the embodiment shown in FIG. 2.

FIG. 3 shows an enlarged view of the bent portion of the water containing trap 24 according to the embodiment shown in FIG. 2. The bent portion is provided such that, when the condensed water is stored in the water containing trap 24, a gap 30 can be formed between the upper surface level of the stored water and the upper portion of the inner wall of the piping. With the bent portion formed in this manner, even when the condensed water is stored at the maximum level and is frozen in the water containing trap 24, it is possible to prevent the gas supply piping 18 from being clogged. Here, it is also possible to provide the bent portion in the gas supply piping 18 such that the gap 30 can be formed, in consideration of the inclination requirements of the vehicle. If the vehicle body is inclined at a predetermined angle, for example, it is possible to provide a bent portion such that a gap can be formed between the upper surface level of the stored water and the upper portion of the inner wall of the piping, when the condensed water is stored in the water containing trap 24 of the gas supply piping 18.

Figure 4:
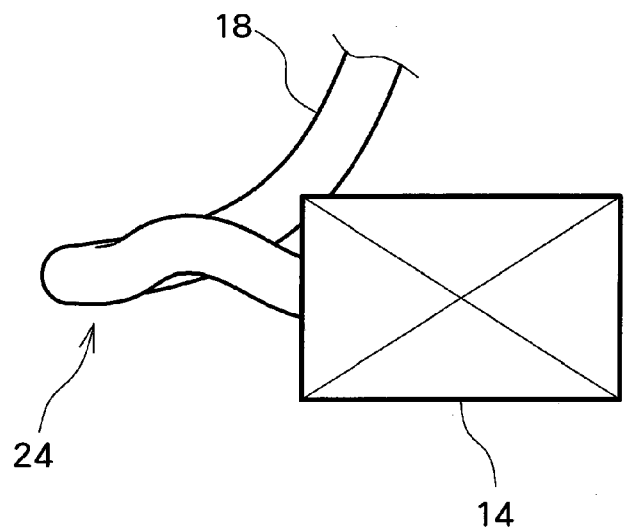
FIG. 4 is a view showing a water containing trap provided in piping in another embodiment of the present invention.

FIG. 4 shows the water containing trap 24 provided in the gas supply piping 18 according to another embodiment of the present invention. While in the embodiment shown in FIGS. 2 and 3, the water containing trap 24 is provided by bending the gas supply piping 18 in the vertical direction, the water containing trap 24 of the present embodiment is provided by bending the gas supply piping 18 not only in the vertical direction but also in the horizontal direction. In FIG. 4, for example, the water containing trap 24 is provided by bending the gas supply piping 18 by approximately 180 degrees in the horizontal direction.

The water containing trap 24 according to the embodiments described with reference to FIGS. 2 to 4, which has been described concerning the cathode-side gas supply piping 18 as an example, is provided at least one of the anode-side gas supply piping 16, the cathode-side gas supply piping 18, and the cathode-side gas discharge piping 20. In a fuel cell system including a humidifier in only one of the cathode-side gas supply system and the anode-side gas supply system, the water containing trap of the present embodiment can be provided in the piping interconnecting the humidifier and the fuel cell in the same manner.

In the embodiments described above with reference to FIGS. 2 to 4, the piping interconnecting the humidifier and the fuel cell is disposed with a rising gradient from the end portion of the piping on the humidifier side toward the end portion of the piping on the fuel cell side. In another embodiment, however, the piping interconnecting the humidifier and the fuel cell may be disposed with no gradient, that is, such that the level of the end portion of the piping on the humidifier side and the level of the end portion of the piping on the fuel cell side are approximately the same.

Further, the water containing trap according to the embodiments described above with reference to FIGS. 2 to 4 can be provided in the gas discharge piping 22 of the humidifier 14. If the humidifier 14 is disposed at the lowest level among all the components of a vehicle, as in the case where the humidifier 14 is disposed under the floor of the vehicle, the discharge port of the humidifier which is connected to one end of the gas discharge piping 22 is located at a lower level than the discharge port of the gas discharge piping 22 communicating with the outside of the vehicle, which is provided on the other end of the gas discharge piping 22 opposite to the humidifier side. In this case, the condensed water generated in the gas discharge piping 22 of the humidifier 14 is not discharged to the outside of the vehicle and flows into the humidifier 14. However, with the water containing trap provided in the gas discharge piping 22 of the humidifier 14, it is possible to prevent the condensed water from being stored in the humidifier 14, thereby avoiding the problems caused by freezing of the condensed water.

Generalizing the embodiments described above, preferably, a fuel cell system in accordance with one aspect of the present invention includes a fuel cell, a humidifier which humidifies gas to be supplied to the fuel cell, gas supply piping which interconnects the fuel cell and the humidifier and serves as a passage of the gas to be supplied, first gas discharge piping which interconnects the fuel cell and the humidifier and transmits the gas discharged from the fuel cell to the humidifier, and second gas discharge piping which guides gas discharged from the humidifier to the outside of the vehicle, wherein the humidifier uses a water content in the gas discharged from the fuel cell to humidify the gas to be supplied to the fuel cell, and at least one of the gas supply piping, the first gas discharge piping, and the second gas discharge piping includes a water containing trap for storing water. Further, at least one of the gas supply piping and the first gas discharge piping is preferably disposed with a rising gradient from the end portion of the piping on the humidifier side toward the end portion of the piping on the fuel cell side. In addition, the water containing trap preferably includes a portion in the piping which is bent vertically downward relative to the portions located front and back of the portion which is bent. Further, the water containing trap is preferably provided by bending the piping not only in the vertical direction but also in the horizontal direction. Also, the water containing trap is preferably provided such that a gap can be formed between the upper surface level of the water stored in the water containing trap and the upper portion of the inner wall of the piping.

The invention claimed is:

1. A vehicle, comprising:
   a fuel cell which is mounted within an engine compartment of the vehicle;
   a humidifier which humidifies gas to be supplied to the fuel cell, the humidifier being provided under a floor of the vehicle; and
   gas supply piping which interconnects the fuel cell and the humidifier and serves as a passage for the gas to be supplied, the gas supply piping having a bent portion,
   wherein the gas supply piping includes a water containing trap for storing condensed water, the water containing trap being formed only within the gas supply piping at the bent portion,
   wherein the water containing trap is a bottom part of the bent portion in the gas supply piping,
   wherein an upstream side portion of the bent portion is bent vertically upward and then extends downward toward the humidifier and a downstream side portion of the bent portion extends vertically upward toward the fuel cell,
   wherein an upper portion of an inner wall of the bent portion is above a lower portion of an inner wall of the upstream side portion of the bent portion in the vertical direction such that a gap is formed between an upper surface level of condensed water stored in the water containing trap and the upper portion of the inner wall of the bent portion in the gas supply piping, and
   wherein the gas to be supplied to the fuel cell is able to pass through the gap.

2. The vehicle according to claim 1, wherein
   an end portion of the gas supply piping on a side of the fuel cell is disposed at a higher level than an end portion of the gas supply piping on a side of the humidifier.

3. The vehicle according to claim 1, further comprising:
   first gas discharge piping which interconnects the fuel cell and the humidifier and transmits gas discharged from the fuel cell to the humidifier; and
   second gas discharge piping which guides gas discharged from the humidifier to the outside of the vehicle;
   wherein the humidifier uses a water content in the gas discharged from the fuel cell to humidify the gas supplied to a fuel gas, and
   at least one of the first gas discharge piping and the second gas discharge piping includes an additional water containing trap for storing condensed water.

4. The vehicle according to claim 3, wherein
   an end portion of the first gas discharge piping on the side of the fuel cell is disposed at a higher level than an end portion of the first gas discharge piping on a side of the humidifier.

5. The vehicle according to claim 2, further comprising:
   first gas discharge piping which interconnects the fuel cell and the humidifier and transmits gas discharged from the fuel cell to the humidifier; and
   second gas discharge piping which guides gas discharged from the humidifier to the outside of the vehicle;
   wherein
      the humidifier uses a water content in the gas discharged from the fuel cell to humidify the gas supplied to a fuel gas, and
      at least one of the first gas discharge piping and the second gas discharge piping includes an additional water containing trap for storing condensed water.

6. The vehicle according to claim 5, wherein
   an end portion of the first gas discharge piping on the side of the fuel cell is disposed at a higher level than an end portion of the first gas discharge piping on a side of the humidifier.

7. The vehicle according to claim 1, wherein
   the water containing trap is provided by bending the gas supply piping not only in the vertical direction but also in the horizontal direction.

8. The vehicle according to claim 2, wherein
   the water containing trap is provided by bending the gas supply piping not only in the vertical direction but also in the horizontal direction.

* * * * *